United States Patent
Varanese et al.

(10) Patent No.: US 9,473,328 B2
(45) Date of Patent: Oct. 18, 2016

(54) WIDEBAND SIGNAL GENERATION FOR CHANNEL ESTIMATION IN TIME-DIVISION-DUPLEXING COMMUNICATION SYSTEMS

(71) Applicant: QUALCOMM Incorporated, San Diego, CA (US)

(72) Inventors: Nicola Varanese, Nuremberg (DE); Juan Montojo, Nuremberg (DE); Christian Pietsch, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 14/062,710

(22) Filed: Oct. 24, 2013

(65) Prior Publication Data

US 2014/0321258 A1    Oct. 30, 2014

Related U.S. Application Data

(60) Provisional application No. 61/816,606, filed on Apr. 26, 2013.

(51) Int. Cl.
| | |
|---|---|
| H04L 25/02 | (2006.01) |
| H04L 5/00 | (2006.01) |
| H04Q 11/00 | (2006.01) |
| H04J 3/16 | (2006.01) |
| H04L 5/14 | (2006.01) |

(52) U.S. Cl.
CPC ......... *H04L 25/0226* (2013.01); *H04J 3/1694* (2013.01); *H04L 5/0048* (2013.01); *H04L 5/1423* (2013.01); *H04L 5/1469* (2013.01); *H04Q 11/0062* (2013.01); *H04L 5/0007* (2013.01); *H04L 5/0082* (2013.01)

(58) Field of Classification Search
CPC ..... H04L 5/0007; H04L 5/0048; H04L 5/14; H04L 5/16; H04L 5/22; H04N 7/10
See application file for complete search history.

(56) References Cited

U.S. PATENT DOCUMENTS

| | | |
|---|---|---|
| 6,891,841 B2 | 5/2005 | Leatherbury et al. |
| 7,295,518 B1 | 11/2007 | Monk et al. |

(Continued)

FOREIGN PATENT DOCUMENTS

| | | |
|---|---|---|
| WO | 2013007391 A1 | 1/2013 |

OTHER PUBLICATIONS

Boyd E., et al., "EPOC Upstream PHY Link Channel and Channel Probing" ,IEEE Draft; BOYD_3BN_03_0513, IEEE-SA,Piscataway, NJ USA, vol. 802.3bn, Jun. 5, 2013,pp. 1-23, XP068058294,[retrieved on Jun. 5, 2013],pp. 8,13,16-19.

(Continued)

*Primary Examiner* — Alpus H Hsu
(74) *Attorney, Agent, or Firm* — Paradice and Li LLP

(57) ABSTRACT

A coax network unit (CNU) is coupled to a coax line terminal (CLT). In first and second modes of operation, the CNU transmits data during an upstream window and receives data during a downstream window. In the first mode of operation, a duration of data transmission for the upstream window or a duration of data reception for the downstream window is reduced by a specified amount with respect to the second mode. A sounding signal is transmitted in the first mode in a probing slot that has a duration corresponding to the specified amount.

29 Claims, 12 Drawing Sheets

(56) References Cited

U.S. PATENT DOCUMENTS

| | | | |
|---|---|---|---|
| 7,551,610 B2* | 6/2009 | Cummings et al. | 370/354 |
| 8,149,861 B2* | 4/2012 | Yu et al. | 370/442 |
| 8,254,413 B2* | 8/2012 | Kliger et al. | 370/480 |
| 8,351,368 B2* | 1/2013 | Malik et al. | 370/318 |
| 8,416,800 B2* | 4/2013 | Sun | 370/461 |
| 8,554,082 B2* | 10/2013 | Boyd et al. | 398/116 |
| 8,842,991 B2* | 9/2014 | Liang | H04Q 11/0067 398/66 |
| 8,848,523 B2* | 9/2014 | Boyd | H04Q 11/0067 370/229 |
| 8,997,165 B2* | 3/2015 | Garavaglia et al. | 725/129 |
| 9,363,017 B2* | 6/2016 | Varanese | H04B 10/27 |
| 2009/0290504 A1* | 11/2009 | Yu | 370/252 |
| 2012/0189072 A1 | 7/2012 | Tzannes et al. | |
| 2013/0142515 A1* | 6/2013 | Chen et al. | 398/67 |
| 2013/0202293 A1* | 8/2013 | Boyd et al. | 398/38 |
| 2013/0202304 A1* | 8/2013 | Boyd et al. | 398/98 |
| 2013/0315595 A1* | 11/2013 | Barr | 398/67 |
| 2013/0322882 A1* | 12/2013 | Fang et al. | 398/67 |
| 2013/0343761 A1* | 12/2013 | Fang et al. | 398/115 |
| 2014/0010537 A1* | 1/2014 | Boyd | 398/58 |
| 2014/0056586 A1* | 2/2014 | Boyde et al. | 398/76 |
| 2014/0072304 A1* | 3/2014 | Boyd et al. | 398/67 |
| 2014/0079102 A1* | 3/2014 | Kliger et al. | 375/222 |
| 2014/0079399 A1* | 3/2014 | Goswami et al. | 398/76 |
| 2014/0133856 A1* | 5/2014 | Boyd et al. | 398/58 |
| 2014/0133858 A1* | 5/2014 | Fang et al. | 398/66 |
| 2014/0133859 A1* | 5/2014 | Fang et al. | 398/76 |
| 2014/0192803 A1* | 7/2014 | Malik et al. | 370/389 |
| 2014/0199069 A1* | 7/2014 | Garavaglia | H04Q 11/0067 398/66 |
| 2014/0248054 A1* | 9/2014 | Wu | H04Q 11/0067 398/66 |
| 2014/0254697 A1* | 9/2014 | Zhang et al. | 375/260 |
| 2015/0229432 A1* | 8/2015 | Shellhammer | H04L 12/2801 398/58 |

OTHER PUBLICATIONS

International Search Report and Written Opinion—PCT/US2014/034717—ISA/EPO—Jul. 15, 2014.

Lin R., et al., "Discussion on EPoC PHY Functions", IEEE Draft; LIN_01_1012, IEEE-SA, Piscataway, NJ USA, vol. 802.3bn, Oct. 25, 2012, pp. 1-29, XP068020424,[retrieved on Oct. 25, 2012],p. 1,5,12-15.

Rahman S., et al., "Wideband Channel Estimation in Upstream EPoC",IEEE Draft; RAHMAN_SYED_3BN_L_01_0313, IEEE-SA, Piscataway, NJ USA, vol. 802.3bn, Mar. 16, 2013, pp. 1-11, XP068052843,[retrieved on Mar. 16, 2013].

* cited by examiner

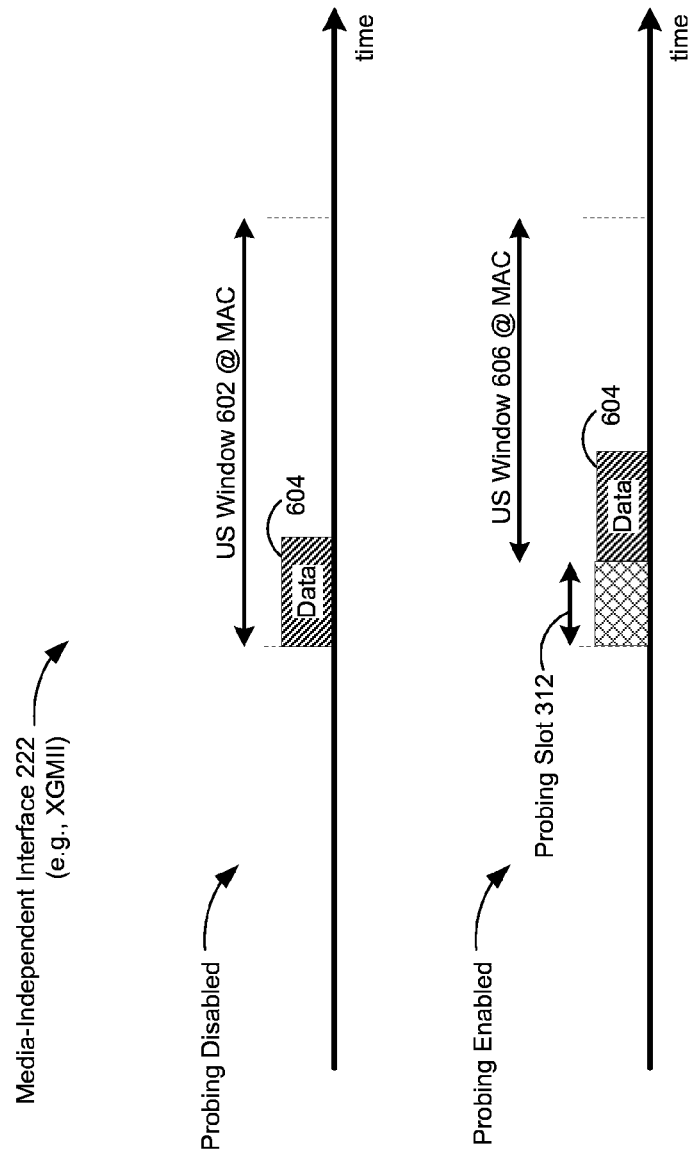

WIDEBAND SIGNAL GENERATION FOR CHANNEL ESTIMATION IN TIME-DIVISION-DUPLEXING COMMUNICATION SYSTEMS

RELATED APPLICATION

This application claims priority to U.S. Provisional Patent Application No. 61/816,606, titled "Wideband Signal Generation for Channel Estimation in Time-Division-Duplexing Communication Systems," filed Apr. 26, 2013, which is hereby incorporated by reference in its entirety.

TECHNICAL FIELD

The present embodiments relate generally to communication systems, and specifically to generation of signals used for channel estimation in communication systems that use time-division duplexing.

BACKGROUND OF RELATED ART

The Ethernet Passive Optical Networks (EPON) protocol may be extended over coaxial (coax) links in a cable plant. The EPON protocol as implemented over coax links is called EPON Protocol over Coax (EPoC). Implementing an EPoC network or similar network over a cable plant presents significant challenges. For example, there is a need for efficient techniques to generate signals used for channel estimation.

SUMMARY

In some embodiments, a method of data communication is performed in a coax network unit (CNU) coupled to a coax line terminal (CLT). In first and second modes of operation, the CNU transmits data during an upstream window and receives data during a downstream window. In the first mode of operation, a duration of data transmission for the upstream window or a duration of data reception for the downstream window is reduced by a specified amount with respect to the second mode. A sounding signal is transmitted in the first mode in a probing slot that has a duration corresponding to the specified amount.

In some embodiments, a CNU includes a coax PHY to transmit data during upstream windows and receive data during downstream windows in first and second modes of operation and to transmit a sounding signal in a probing slot in the first mode. In the first mode the coax PHY is to reduce a duration of data transmission for an upstream window or a duration of data reception for a downstream window by a specified amount with respect to the second mode. The probing slot has a duration corresponding to the specified amount.

In some embodiments, a non-transitory computer-readable storage medium stores one or more programs configured for execution by one or more processors in a CNU. The one or more programs include instructions to adapt a rate of a MAC in the CNU based on whether or not a mode of operation is enabled in which the CNU transmits a sounding signal in a probing slot in a time-division-duplexing (TDD) cycle that includes a downstream window and an upstream window. One of the downstream window and the upstream window is reduced in duration by an amount corresponding to a duration of the probing slot when the mode of operation is enabled as compared to when the mode of operation is not enabled.

BRIEF DESCRIPTION OF THE DRAWINGS

The present embodiments are illustrated by way of example and are not intended to be limited by the figures of the accompanying drawings.

FIG. 6A shows MAC timing adaption based on probing state in accordance with some embodiments.

Like reference numerals refer to corresponding parts throughout the drawings and specification.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
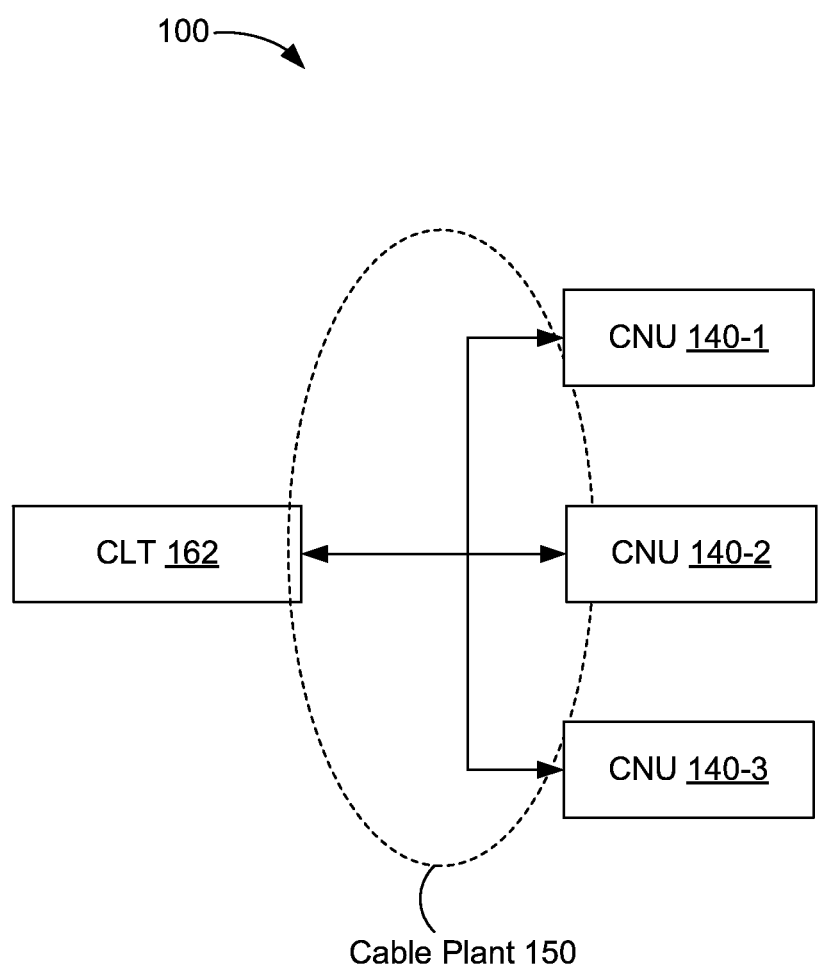
FIG. 1A is a block diagram of a coaxial network in accordance with some embodiments.

FIG. 1A is a block diagram of a coax network 100 (e.g., an EPoC network) in accordance with some embodiments. The network 100 includes a coax line terminal (CLT) 162 coupled to a plurality of coax network units (CNUs) 140-1, 140-2, and 140-3 via coax links. A respective coax link may be a passive coax cable, or may also include one or more amplifiers and/or equalizers, and may run through one or more splitters and/or taps. The coax links compose a cable plant 150. In some embodiments, the CLT 162 is located at the headend of the cable plant 150 and the CNUs 140 are located at the premises of respective users. Alternatively, the CLT 162 is located within the cable plant 150.

The CLT 162 transmits downstream signals to the CNUs 140-1, 140-2, and 140-3 and receives upstream signals from the CNUs 140-1, 140-2, and 140-3. In some embodiments, each CNU 140 receives every packet transmitted by the CLT 162 and discards packets that are not addressed to it. The CNUs 140-1, 140-2, and 140-3 transmit upstream signals using coax resources specified by the CLT 162. For example, the CLT 162 transmits control messages (e.g., GATE messages) to the CNUs 140-1, 140-2, and 140-3 specifying respective future times at which and respective frequencies on which respective CNUs 140 may transmit upstream signals. The bandwidth allocated to a respective CNU by a control message may be referred to as a grant. In some embodiments, the downstream and upstream signals are transmitted using orthogonal frequency-division multiplexing (OFDM). For example, the upstream signals are orthogonal frequency-division multiple access (OFDMA) signals and the downstream signals include modulation symbols on different groups of subcarriers that are directed to different CNUs 140.

Figure 1B:
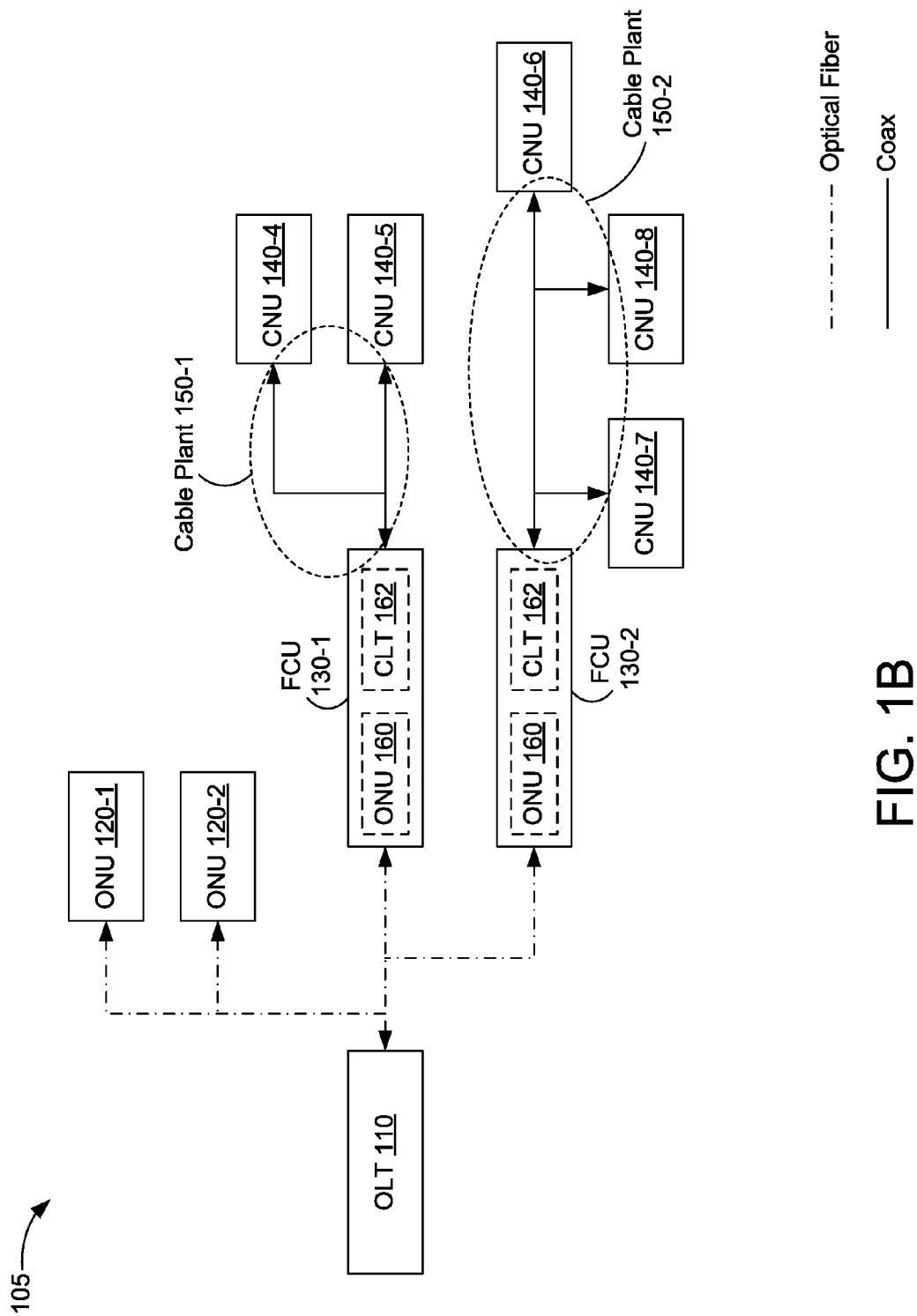
FIG. 1B is a block diagram of a network that includes both optical links and coax links in accordance with some embodiments.

In some embodiments, the CLT 162 is part of a fiber-coax unit (FCU) 130 that is also coupled to an optical line terminal (OLT) 110, as shown in FIG. 1B. FIG. 1B is a block diagram of a network 105 that includes both optical links and coax links in accordance with some embodiments. In the network 105, the OLT 110 is coupled to a plurality of optical network units (ONUs) 120-1 and 120-2 via respective optical fiber links. The OLT 110 also is coupled to a plurality of fiber-coax units (FCUs) 130-1 and 130-2 via respective optical fiber links. FCUs are also referred to as optical-coax units (OCUs).

In some embodiments, each FCU 130-1 and 130-2 includes an ONU 160 coupled with a CLT 162. The ONU 160 receives downstream packet transmissions from the OLT 110 and provides them to the CLT 162, which forwards the packets to the CNUs 140 (e.g., CNUs 140-4 and 140-5, or CNUs 140-6 through 140-8) on its cable plant 150 (e.g., cable plant 150-1 or 150-2). In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first FCU 130-1 communicates with CNUs 140-4 and 140-5 (e.g., using OFDMA), and the second FCU 130-2 communicates with CNUs 140-6, 140-7, and 140-8 (e.g., using OFDMA). The coax links coupling the first FCU 130-1 with CNUs 140-4 and 140-5 compose a first cable plant 150-1. The coax links coupling the second FCU 130-2 with CNUs 140-6 through 140-8 compose a second cable plant 150-2. A respective coax link may be a passive coax cable, or alternately may include one or more amplifiers and/or equalizers, and may run through one or more splitters and/or taps. In some embodiments, the OLT 110, ONUs 120-1 and 120-2, and optical portions of the FCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the FCUs 130 are located at the headends of their respective cable plants 150 or within their respective cable plants 150.

Figure 2:
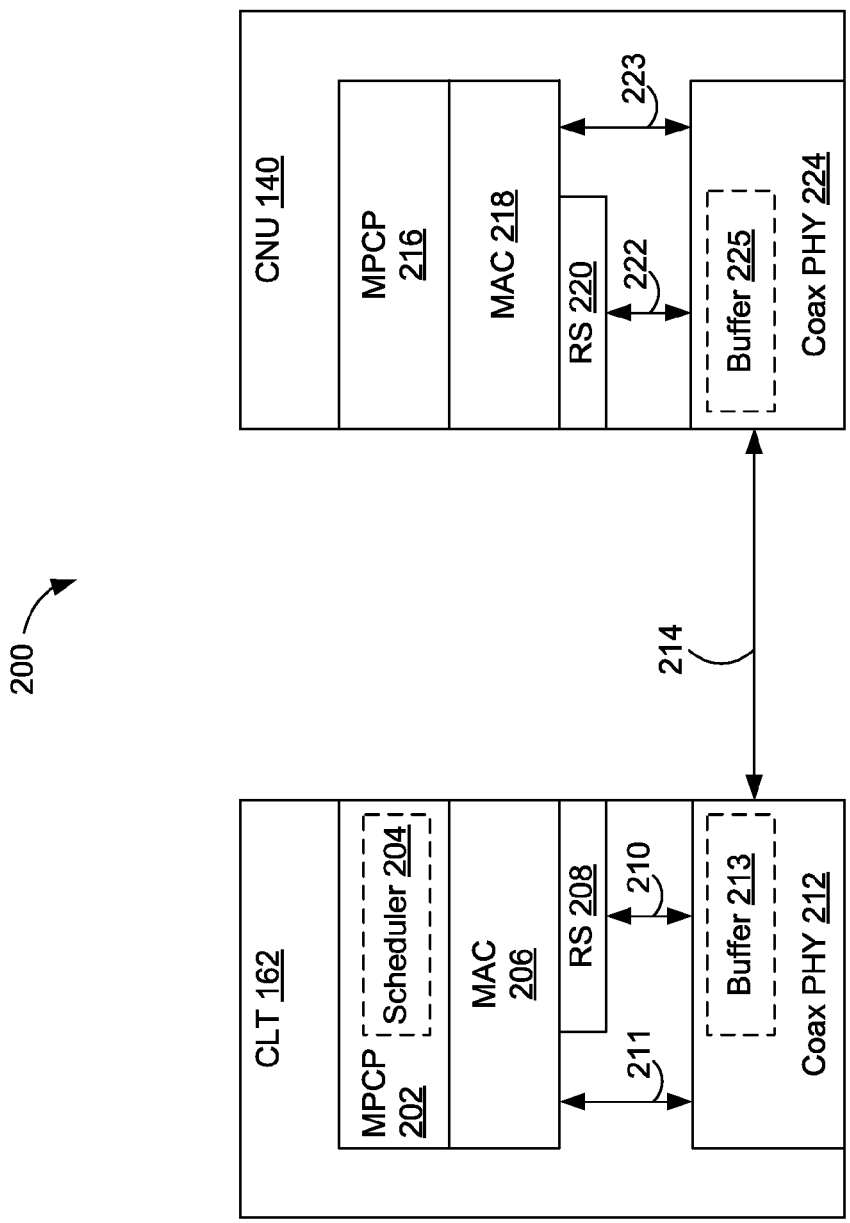
FIG. 2 is a block diagram of a system in which a coax line terminal is coupled to a coax network unit in accordance with some embodiments.

FIG. 2 is a block diagram of a system 200 in which a CLT 162 is coupled to a CNU 140 (e.g., one of the CNUs 140-1 through 140-8, FIGS. 1A-1B) by a coax link 214 (e.g., in a cable plant 150, such as the cable plant 150-1 or 150-2, FIGS. 1A-1B) in accordance with some embodiments. The CLT 162 and CNU 140 communicate via the coax link 214. The coax link 214 couples a coax physical layer (PHY) 212 in the CLT 162 to a coax PHY 224 in the CNU 140.

The coax PHY 212 in the CLT 162 is coupled to a media access controller (MAC) 206 by a media-independent interface 210 and a reconciliation sublayer (RS) 208. In some embodiments, the media-independent interface 210 is a 10-Gigabit Media-Independent Interface (XGMII). The media-independent interface 210 and RS 208 convey data between the coax PHY 212 and MAC 206. The coax PHY 212 is also coupled to the MAC 206 through a management data input/output (MDIO) bus 211 that conveys information about the configuration of the coax PHY 212 and/or MAC 206. The MAC 206 is coupled to a multi-point control protocol (MPCP) implementation 202, which includes a scheduler 204 that schedules downstream and upstream transmissions.

The coax PHY 224 in the CNU 140 is coupled to a MAC 218 by a media-independent interface 222 (e.g., an XGMII) and an RS 220. The media-independent interface 222 and RS 220 convey data between the coax PHY 224 and MAC 218. The coax PHY 224 is also coupled to the MAC 218 through an MDIO bus 223 that conveys information about the configuration of the coax PHY 224 and/or MAC 218. The MAC 218 is coupled to an MPCP implementation 216 that communicates with the MPCP implementation 202 to schedule upstream transmissions (e.g., by sending REPORT messages to the MPCP 202 implementation and receiving GATE messages in response).

In some embodiments, the MPCP implementations 202 and 216 are implemented as distinct sub-layers in the respective protocol stacks of the CLT 162 and CNU 140. In other embodiments, the MPCP implementations 202 and 216 are respectively implemented in the same layers or sub-layers as the MACs 206 and 218.

Communication between a CLT 162 and respective CNUs 140 on a cable plant 150 may be performed using time-division duplexing (TDD). For TDD, upstream and downstream transmissions share one or more frequency bands, with upstream transmissions occurring at different times (e.g., in different time windows) than downstream transmissions.

Figure 3A:
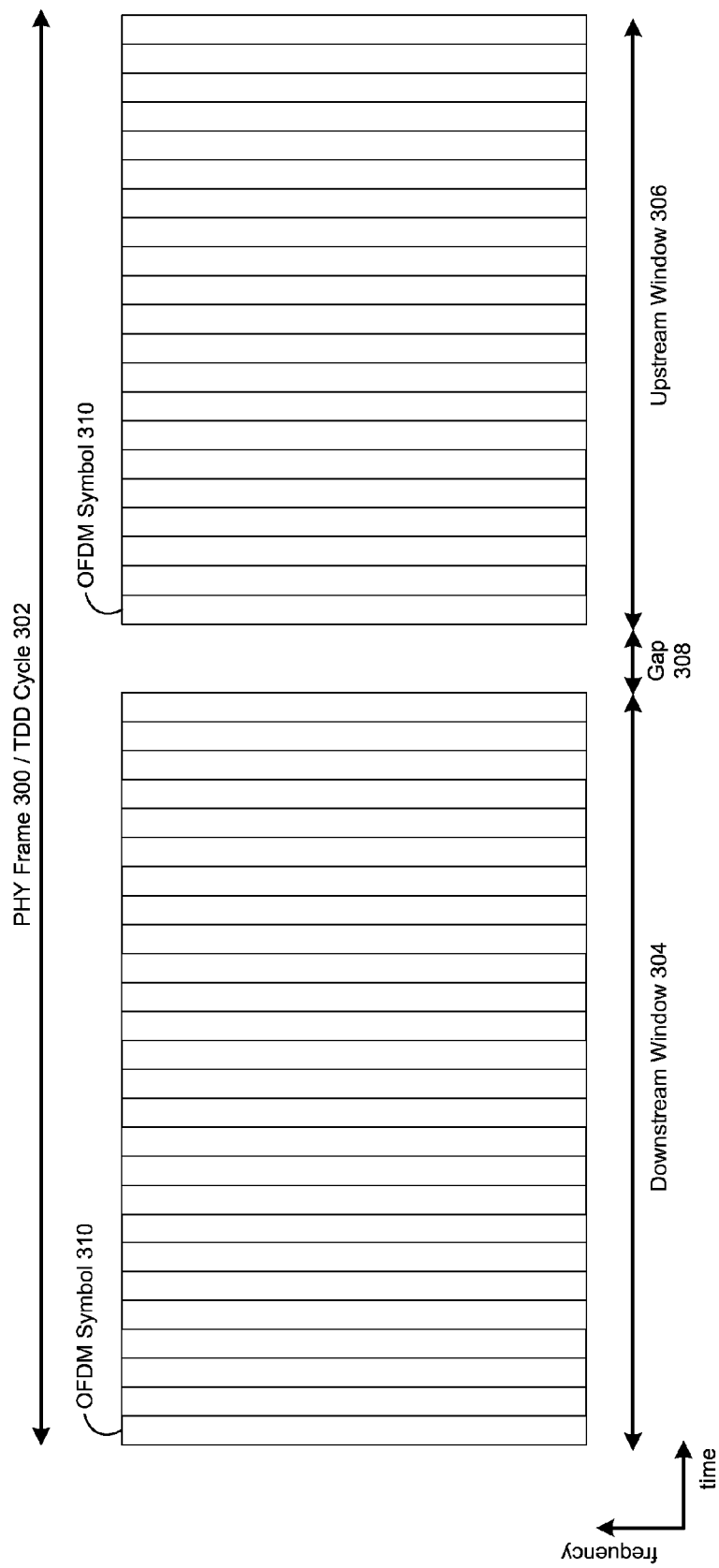
FIG. 3A shows the structure of a physical-layer frame that corresponds to a time-division duplexing cycle in accordance with some embodiments.

FIG. 3A shows the structure of a physical-layer frame ("PHY frame") 300 that corresponds to a TDD cycle 302 in accordance with some embodiments. The TDD cycle 302 is divided into a downstream (DS) window 304, an upstream (US) window 306, and a gap 308 (i.e., a guard interval) between the downstream window 304 and the upstream window 306. During the downstream window 304, a CLT 162 transmits OFDM symbols 310 downstream to CNUs 140 on its cable plant 150. During the upstream window 306, the CLT 162 receives OFDM symbols 310 transmitted upstream by CNUs 140 on its cable plant 150. (Each column in FIG. 3A corresponds to a distinct OFDM symbol 310). In some embodiments, the OFDM symbols 310 in the upstream windows 306 are transmitted using OFDMA: different portions (e.g., different groups of subcarriers) of a respective OFDM symbol 310 in the upstream window 306 are transmitted by different CNUs 140. Also, different portions (e.g., different groups of subcarriers) of a respective OFDM symbol 310 in the downstream window 304 may be directed to different CNUs 140.

In some embodiments, time interleaving is not performed for the PHY frame 300. For example, the PHY frame 300 may be transmitted in a frequency band above (i.e., at higher frequencies than) other frequency bands on the coax channel (e.g., in a frequency band above 800 MHz), where protection against noise or interference bursts may not be needed and therefore time interleaving may not be necessary for reliable communication.

A probing procedure may be performed to estimate the channel between a CNU 140 and CLT 162. Probing is also referred to as sounding. In the probing procedure, the CNU 140 transmits a known, predefined wideband signal upstream to the CLT 162. In some embodiments, the wideband signal is a full OFDM symbol carrying known, predefined modulation symbols on respective subcarriers. For example, the CNU 140 transmits one or more full OFDM symbols that span an entire available frequency band. Probing is performed, for example, before a CNU 140 performs registration with the CLT 162 or begins to transmit data to the CLT 162. Probing can be performed also upon the request of the CLT 162 during regular data transmission.

The CLT 162 estimates the full channel based on the wideband signal. In some embodiments, the CLT 162 assigns an upstream modulation profile to the CNU 140 based on the channel estimate. The modulation profile specifies a modulation and coding scheme (MCS) or set of MCSs that the CNU 140 is to use for upstream transmissions. Each MCS has a corresponding spectral efficiency; the lower the spectral efficiency, the more robust the modulation profile. In some embodiments, the CNU 140 (e.g., the coax PHY 224, FIG. 2) subsequently performs pre-equalization of upstream signals based on the channel estimate. For example, the CLT 162 provides the channel estimate to the CNU 140, which subsequently performs pre-equalization to compensate for the estimated channel. In some embodiments, the CLT 162 determines or refines a timing advance adjustment for the CNU 140 based on the probing. The timing advance adjustment compensates for the propagation delay for the CNU 140. Different CNUs 140 in a cable plant 150 have different propagation delays depending on their location in the cable plant 150. In some embodiments, the CLT 162 determines or refines power control settings for the CNU 140 (e.g., for the coax PHY 224, FIG. 2) based on the probing.

Figure 3B:
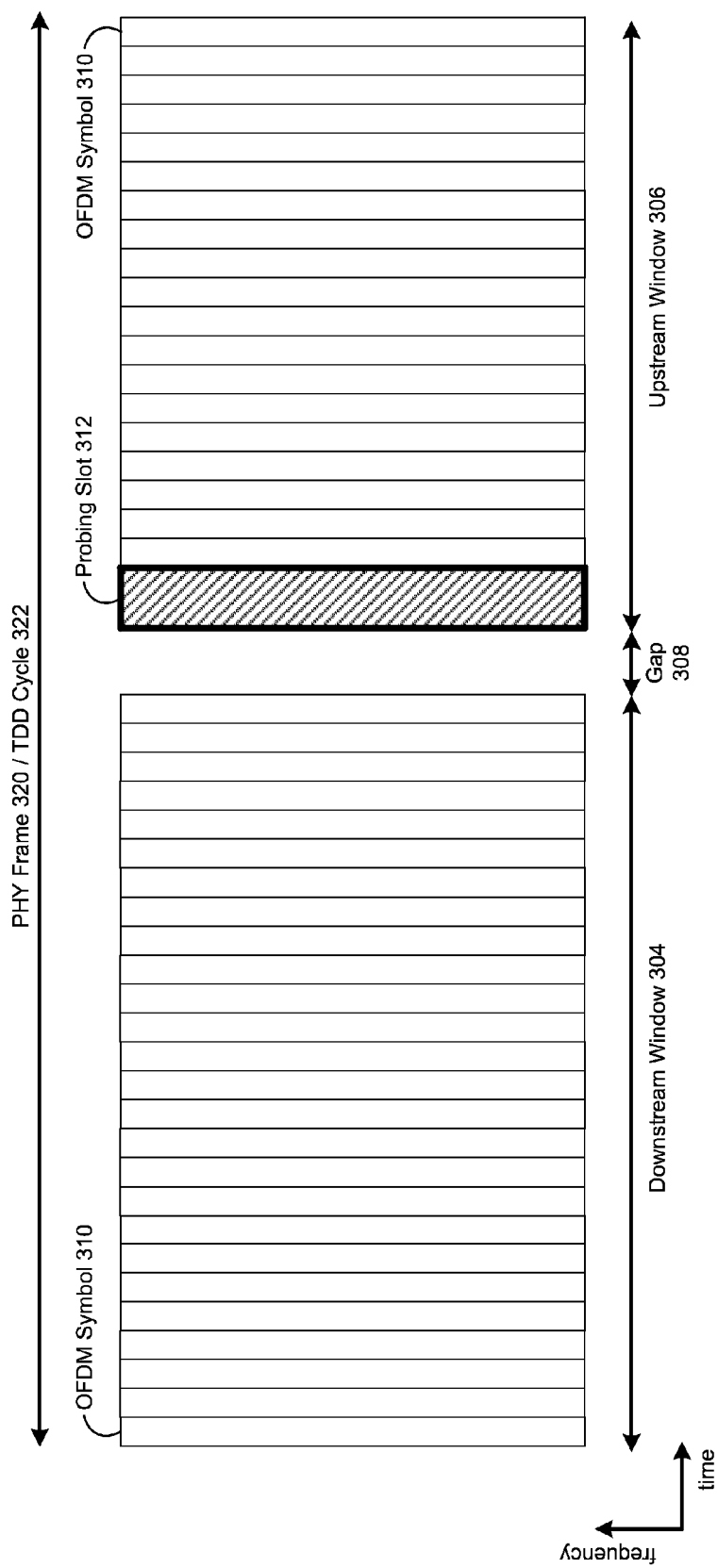
FIG. 3B shows a physical-layer frame in which an initial portion of the upstream window is reserved as a probing slot in accordance with some embodiments.

FIG. 3B shows a PHY frame 320, corresponding to a TDD cycle 322, in which an initial portion of the upstream window 306 is reserved as a probing slot 312 for performing probing (i.e., sounding) in accordance with some embodiments. The probing slot 312 may have a duration equal to the duration of an integer number of OFDM symbols 310 (e.g., two OFDM symbols 310). Alternatively, the probing slot has a duration equal to a fractional number of OFDM symbols 310. Reserving the initial portion of the upstream window 306 as the probing slot 312 reduces a duration of data transmission for the upstream window 306 as compared to the upstream window 306 in the PHY frame 300 (FIG. 3A), since the probing slot 312 is unavailable for data transmission.

Figure 4:
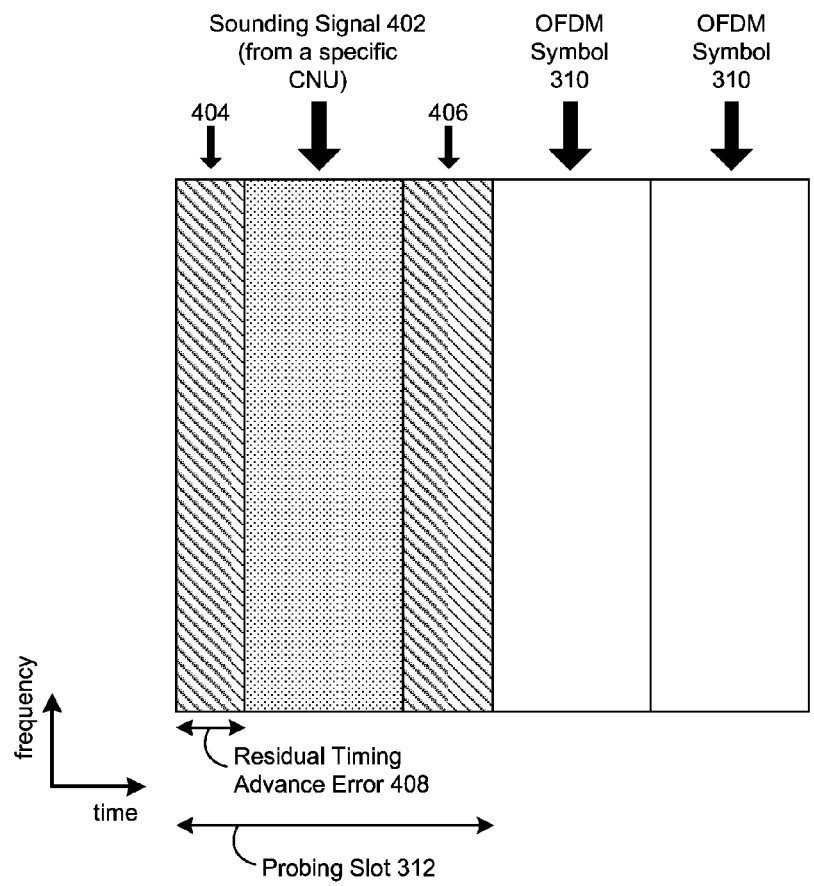
FIG. 4 shows a wideband sounding signal transmitted in a probing slot in accordance with some embodiments.

FIG. 4 shows a wideband sounding signal 402 (i.e., probing signal) transmitted in a probing slot 312 in accordance with some embodiments. A specified CNU 140 transmits the sounding signal 402 upstream to a CLT 162. In this example, the sounding signal 402 is a single OFDM symbol transmitted by the CNU 140. The sounding signal 402 is preceded and followed by respective periods 404 and 406 in the probing slot 312 in which no signal is transmitted. The period 404 preceding the sounding signal 402 corresponds to a timing advance error (e.g., a residual timing advance error 408, assuming an estimate of the timing advance has previously been made). The periods 404 and 406 preceding and following the sounding signal 402 are included in the probing slot 312 to account for the lack of precise knowledge about the timing advance for the CNU 140 before probing has been completed. The probing slot 312 is followed by a series of upstream OFDM symbols 310 used to transmit data from respective CNUs 140 to the CLT 162.

Probing may be turned on or off, such that probing is performed (e.g., in the upstream window 306 of the PHY frame 320, FIG. 3B) in a first mode but not in a second mode. In some embodiments, a downstream PHY link channel (PLC) is used to turn probing on and off, and thus to select between the first and second modes. The PHY link channel may also specify the CNU 140 on a cable plant 150 that is to perform sounding in a particular PHY frame 320.

Figure 5:
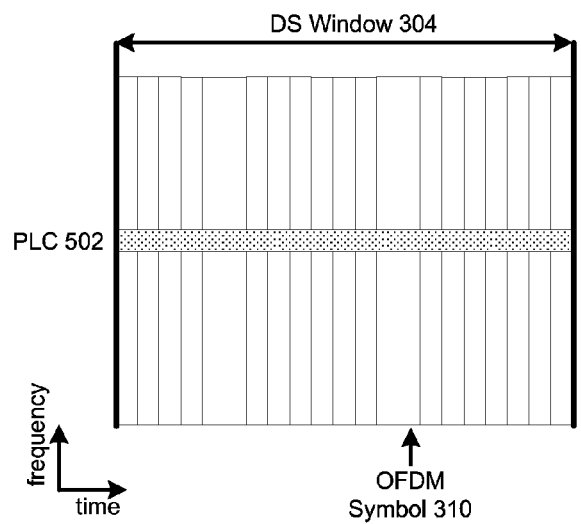
FIG. 5 shows a physical-layer link channel in a downstream window of a physical-layer frame in accordance with some embodiments.

FIG. 5 shows a PHY link channel (PLC) 502 in a downstream window 304 of a PHY frame 300 or 320 in accordance with some embodiments. A specified number of subcarriers (e.g., contiguous subcarriers) is reserved for the PHY link channel 502. The number of subcarriers in the PHY link channel 502 is predefined. In one example, the PHY link channel 502 includes eight subcarriers. In addition to specifying the performance of probing, the PHY link channel 502 may signal changes in MAC data rates to accommodate probing. The PHY link channel 502 may further convey other PHY control information between the coax PHY 212 of a CLT 162 and the coax PHYs 224 of CNUs 140 (FIG. 2).

A probing slot 312 in an upstream window 306 is overhead that reduces data transmission capacity within a PHY frame 320 as compared to a PHY frame 300: the upstream data capacity of a PHY frame 320 with a probing slot 312 (e.g., as shown in FIG. 3B) is less than that of a PHY frame 300 without a probing slot 312 (e.g., as shown in FIG. 3A). The upstream data capacity of PHY frames therefore varies depending on whether or not probing is enabled. In some embodiments, the MAC 218 and MAC 206 (FIG. 2) may convey data at the worst-case rate, which is the rate when probing is enabled. However, this approach is inefficient, since it wastes bandwidth when probing is not enabled. Therefore, the rate of the MAC 218 and MAC 206 may be adapted depending on whether probing is enabled or disabled. For example, the MAC 218 in the CNU 140 is informed of the effective PHY rate through the MDIO bus 223. The MAC 206 in the CLT 162 may similarly be informed of the effective PHY rate through the MDIO bus 211. In another example, probing is enabled and disabled in a predefined pattern that is known to the MAC 218 and/or MAC 206, such that the PHY probing state varies in a known, predefined pattern.

In some embodiments, MAC rate adaption is implemented by performing MAC timing adaption. FIG. 6A shows MAC timing adaption based on the probing state in accordance with some embodiments. FIG. 6A shows the timing for data 604 that the MAC 218 of the CNU 140 (FIG. 2) provides to the coax PHY 224 through the media-independent interface 222 (and RS 220). When probing is enabled (e.g., in a first mode), the beginning of the upstream window 606 in the MAC 218 is delayed with respect to the beginning of the upstream window 602 in the MAC 218 when probing is disabled (e.g., in a second mode). The amount of the delay corresponds to (e.g., equals) the duration of the probing slot 312. Data 604 provided to the coax PHY 224 by the MAC 218 therefore is delayed when probing is enabled (e.g., in the first mode) as compared to when probing is disabled (e.g., in the second mode). Accordingly, the MAC 218 is aware of the duration of the probing slot 312, which equals the change in duration of the upstream window 602 as compared to the upstream window 606.

In some embodiments, the MAC 218 in the CNU 140 performs rate adaption but not timing adaption. For example, the MAC 218 is aware of changes in the effective PHY rate resulting from enabling and disabling probing, but is not aware of the associated timing changes (e.g., including the duration of the probing slot 312). In such embodiments, the coax PHY 224 in the CNU 140 changes its mapping of time-domain data (e.g., data 604), as received from the MAC 218, to coax resources in the time and frequency domains, depending on whether probing is enabled or disabled.

Figure 6B:
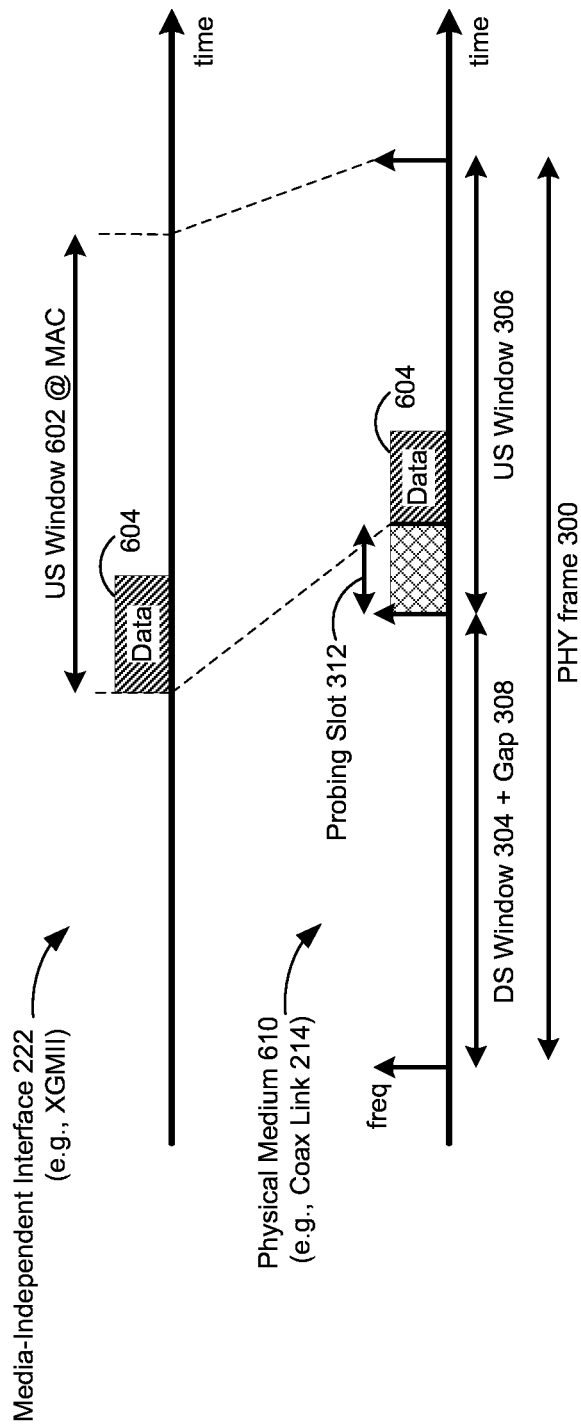
FIG. 6B shows MAC and PHY timing with probing enabled in accordance with some embodiments.

FIG. 6B shows the timing of this PHY-level resource mapping with respect to the MAC timing when probing is enabled (e.g., in the first mode), in accordance with some embodiments. In FIG. 6B, there is an offset between the upstream window 602 in the MAC 218 and the upstream window 306 on the physical medium 610 (e.g., on the coax link 214). This offset corresponds to a fixed delay through the coax PHY 224. The MAC 218 begins to provide data 604 to the coax PHY 224 through the media-independent interface 222 (and RS 220) at the beginning of the upstream window 602 in the MAC. The PHY 224, however, delays mapping of the data 604 onto time-and-frequency-domain resources until after a delay equal to the duration of the probing slot 312. The PHY 224 buffers the data 604 until the mapping is performed. The PHY 224 thus performs additional buffering (e.g., in the buffer 225, FIG. 2) when probing is enabled (e.g., in the first mode) as opposed to when probing is disabled (e.g., in the second mode).

Figure 7A:
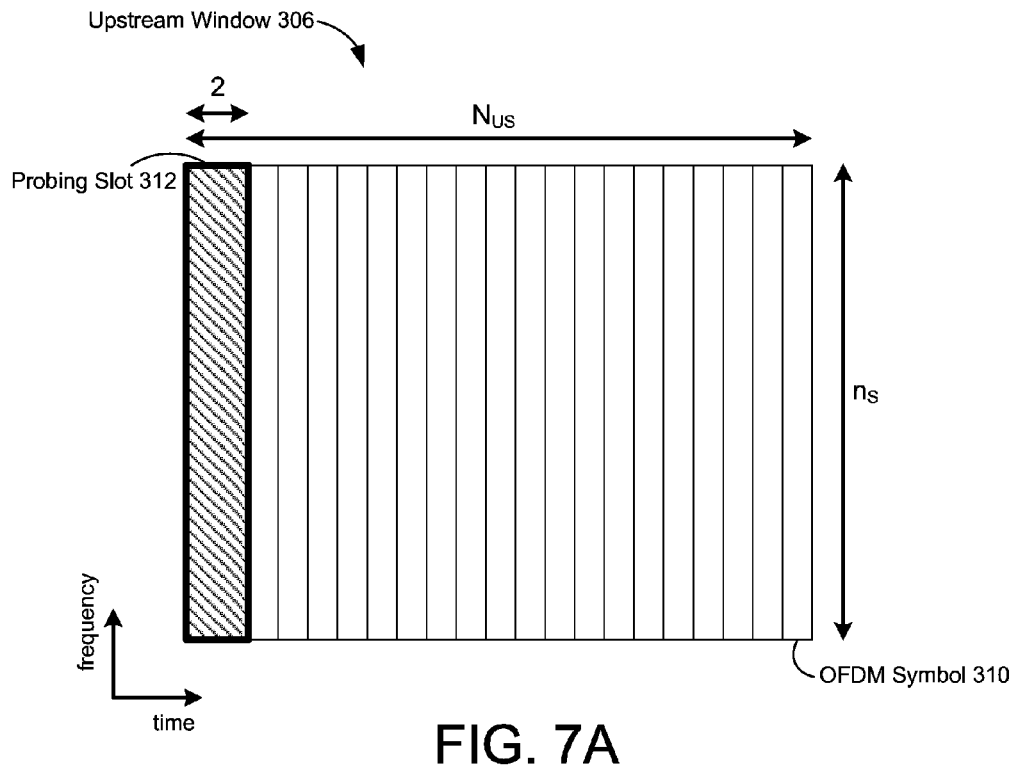
FIG. 7A shows an upstream window in a physical-layer frame in accordance with some embodiments.
Figure 7B:
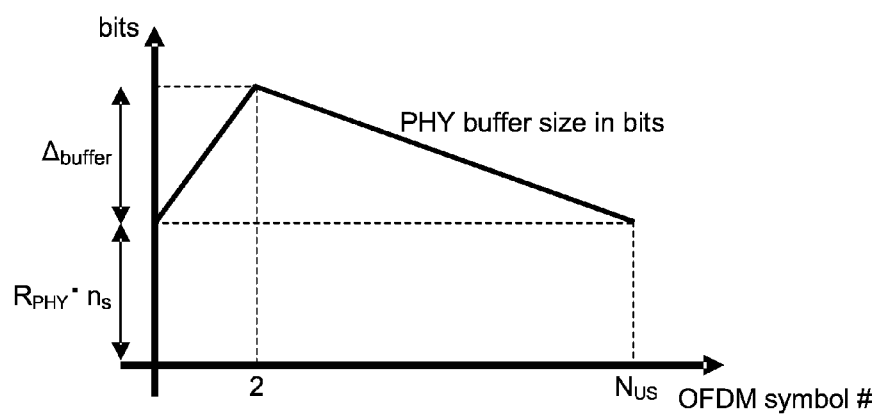
FIG. 7B shows amounts of buffering in a coax physical layer with sounding enabled in accordance with some embodiments.

FIGS. 7A and 7B illustrate calculation of the amount of additional buffering to be performed in the PHY 224 (e.g., in the buffer 225, FIG. 2) in accordance with FIG. 6B. FIG. 7A shows an upstream window 306 with a duration corresponding to $N_{US}$ OFDM symbols 310, where $N_{US}$ is an integer greater than two, in accordance with some embodiments. Each OFDM symbol 310 includes $n_s$ subcarriers. The first two OFDM symbols 310 are replaced with a probing slot 312 (e.g., as described with respect to FIGS. 3B and 4). The maximum rate of the coax PHY 224 in bps/Hz (bits per second per Hertz), accounting for all overhead, is defined as $R_{PHY}$. When probing is disabled (e.g., in the second mode), a minimum amount of buffering in the PHY 224 (e.g., in the buffer 225, FIG. 2) is quantified as $R_{PHY}$ times $n_s$ (i.e., $R_{PHY}*n_s$), as shown in FIG. 7B. This minimum amount of buffering equals the amount of data in a single OFDM symbol 310, which is collected and therefore buffered in the PHY 224 (e.g., in the buffer 225, FIG. 2) before the PHY 224 processes the OFDM symbol 310. When probing is enabled (e.g., in the first mode), an additional amount of buffering, $\Delta_{buffer}$, is performed in the PHY 224 (e.g., in the buffer 225, FIG. 2). The additional amount of buffering, for this specific example where the duration of the probing slot 312 equals two OFDM symbols 310, is quantified as:

$$\Delta_{buffer} = R_{PHY}*n_s. \quad (1)$$

As a result, the minimum amount of buffering (and thus the minimum size of the buffer 225, FIG. 2) when probing is enabled in this example equals $2*R_{PHY}*n_s$, which equals the amount of data for two OFDM symbols 310: since the probing slot 312 has a duration of two OFDM symbols 310, this is the amount of data that the MAC 218 provides to the PHY 224 during the probing slot 312. More generally, the first M OFDM symbols 310 may be replaced with a probing slot 312, such that the probing slot 312 has a duration of M OFDM symbols 310. The additional buffering is then $(M-1)*R_{PHY}*n_s$, for a total minimum buffer size of $M*R_{PHY}*n_s$.

The additional buffering introduces a corresponding increase in the upstream transmission delay. In some embodiments, the increased upstream transmission delay is enforced even when probing is disabled in order to have a substantially constant delay at the interface between MAC and PHY in all states/modes (e.g., including states such as the first mode in which probing is enabled and states such as the second mode in which probing is disabled). For example, additional buffering is performed in the CLT 162 (e.g., in the buffer 213, FIG. 2) to enforce the increased upstream transmission delay when probing is disabled.

Figure 8:
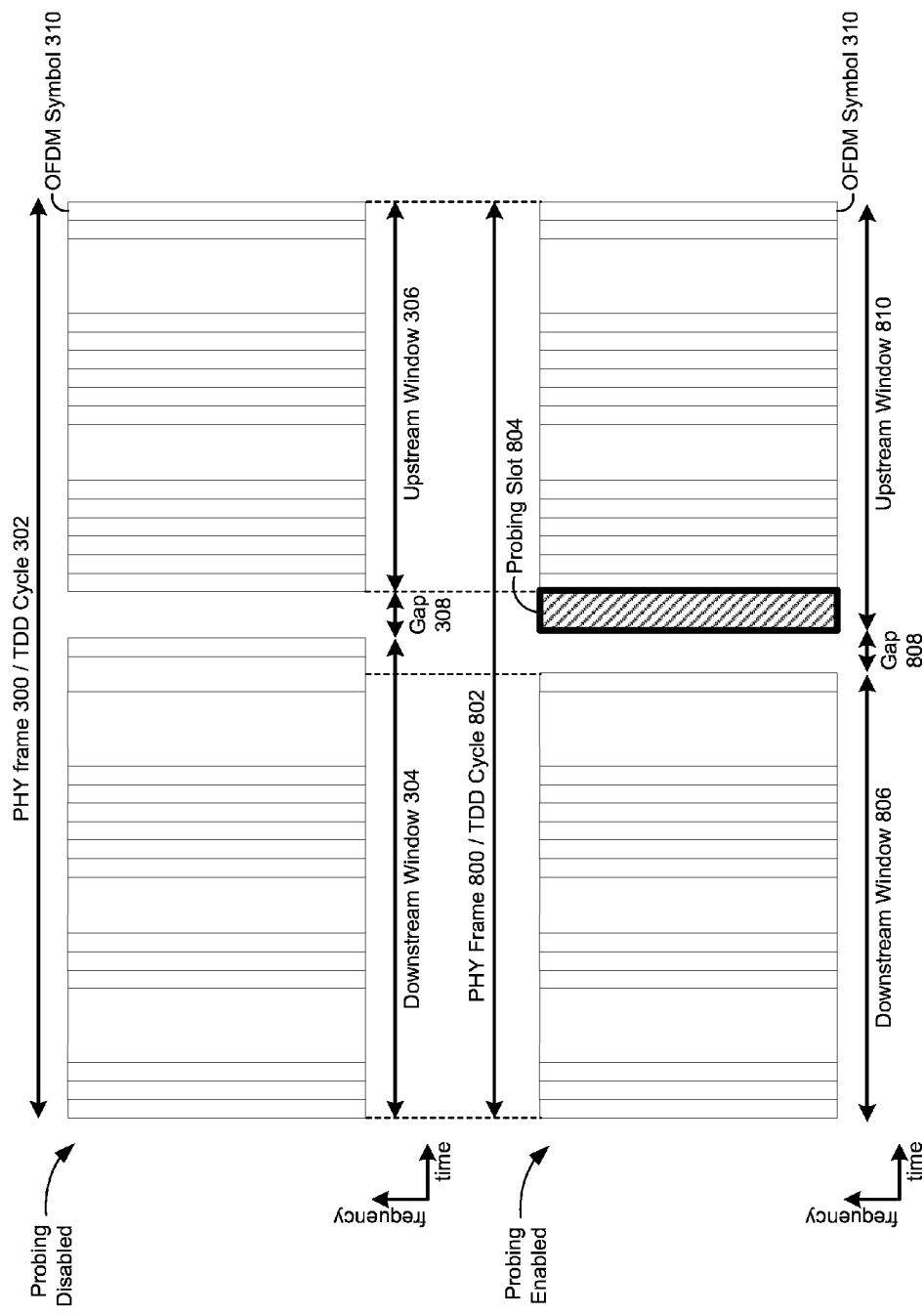
FIG. 8 shows a physical-layer frame with probing disabled and enabled in accordance with some embodiments.

FIG. 8 shows an alternative PHY frame 800 to the PHY frame 300 (FIG. 3A) and 320 (FIG. 3B) in accordance with some embodiments. (FIG. 8 also shows the PHY frame 300 for comparison.) The PHY frame 800 (in a TDD cycle 802) is used when probing is enabled (e.g., in the first mode). The number of OFDM symbols 310 in the upstream window 810 of the PHY frame 800 is unchanged with respect to the upstream window 306 of the PHY frame 300, which is used when probing is disabled (e.g., in the second mode). Instead, the duration of the downstream window 806 in the PHY frame 800 is reduced with respect to the downstream window 304 in the PHY frame 300, to accommodate a probing slot 804. For example, the number of OFDM symbols 310 in the downstream window 806 is reduced by an amount corresponding to the duration of the probing slot 804. In the example of FIG. 8, the downstream window 806 is reduced by two OFDM symbols 310 with respect to the downstream window 304. A gap 808 separates the downstream window 806 and upstream window 810.

The structure of the PHY frame 800 avoids the additional buffering in the CNU 140 (e.g., in the buffer 225, FIG. 2) and corresponding increase in upstream transmission delay described with respect to FIGS. 7A and 7B. Instead, the effective downstream rate changes depending on whether probing is enabled. To accommodate this change in the effective downstream rate, the MAC 206 in the CLT 162 is informed of the changed downstream window duration (e.g., via the MDIO bus 211, FIG. 2). The MAC 206 may adapt its rate in an analogous manner to the upstream MAC rate adaptation described for the MAC 218.

Figure 9:
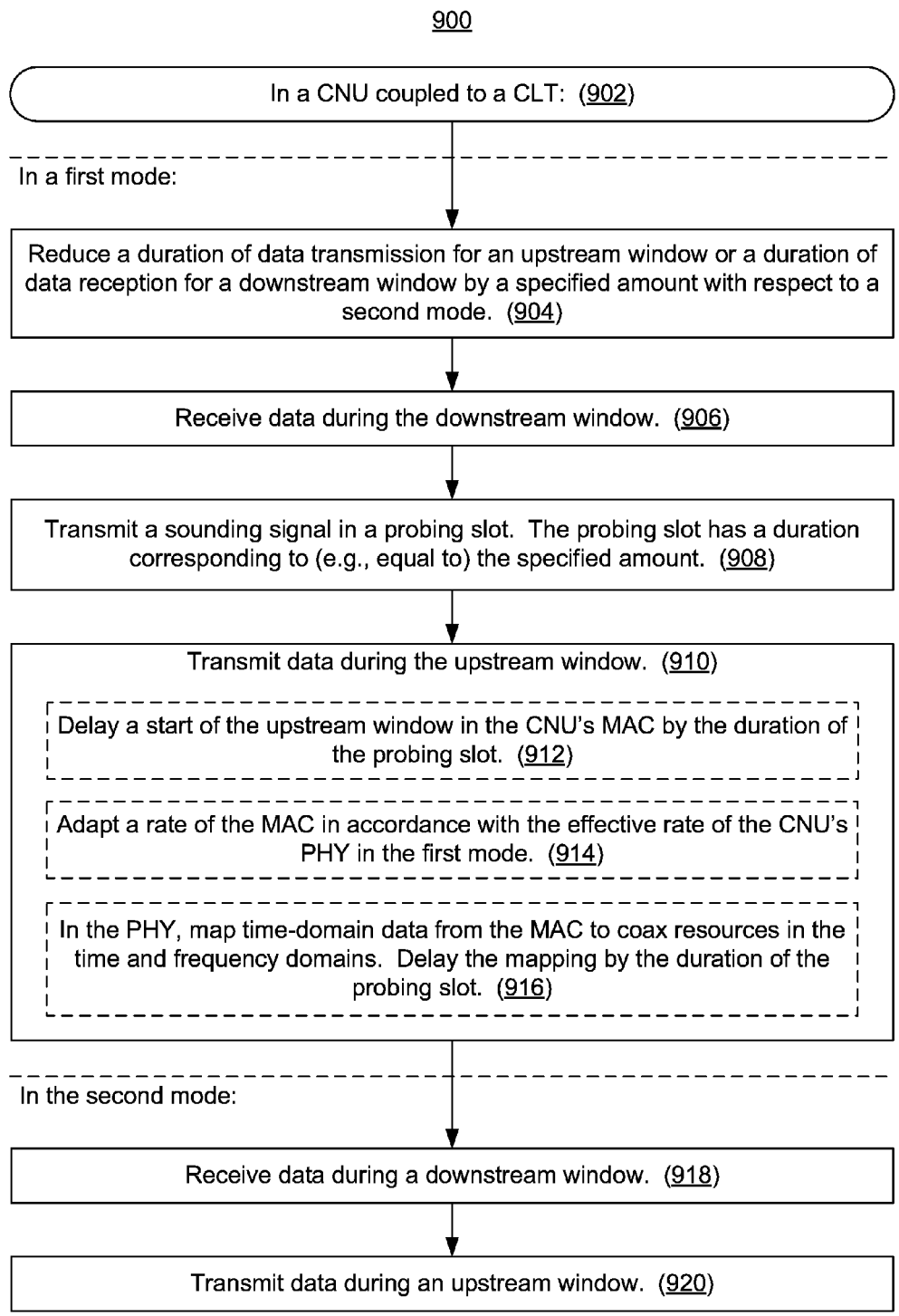
FIG. 9 is a flowchart showing a method of operating a coax network unit coupled to a coax line terminal in accordance with some embodiments.

FIG. 9 is a flowchart showing a method 900 performed (902) in a CNU 140 coupled to a CLT 162 (FIGS. 1A-1B, 2) in accordance with some embodiments. The CNU 140 of the method 900 operates in a first mode and a second mode. Sounding is enabled in the first mode and disabled in the second mode.

In the first mode, a duration of data transmission for an upstream window or a duration of data reception for a downstream window is reduced (904) by a specified amount with respect to a second mode. For example, a number of OFDM symbols 310 in the upstream window 306 of the PHY frame 320 (FIG. 3B) is reduced by a specified amount with respect to a number of OFDM symbols 310 in the upstream window 306 of the PHY frame 300 (FIG. 3A), thereby reducing the duration of upstream data transmission in the PHY frame 320 as compared to the PHY frame 300. In another example, a number of OFDM symbols 310 in the downstream window 806 of the PHY frame 800 (FIG. 8) is reduced by a specified amount with respect to a number of OFDM symbols 310 in the downstream window 304 of the PHY frame 300 (FIG. 8), thereby reducing the duration of downstream data in the PHY frame 800 as compared to the PHY frame 300.

Data is received (906) during the upstream window (e.g., during the downstream window 304 of the PHY frame 320, FIG. 3B, or the downtream window 806 of the PHY frame 800, FIG. 8).

A sounding signal (e.g., sounding signal 402, FIG. 4) is transmitted (908) in a probing slot (e.g., probing slot 312, FIG. 3B, or 804, FIG. 8). In some embodiments, the sounding signal is a wideband signal, such as an OFDM symbol. The OFDM symbol may span an available frequency band. The probing slot has a duration corresponding to (e.g., equal to) the specified amount. For example, a duration of the sounding signal 402 combined with a duration of a period 404 of no transmission preceding the sounding signal 402 and a duration of a period 406 of no transmission following the sounding signal 402 equals the specified amount, as shown in FIG. 4.

Data is transmitted (910) during the upstream window (e.g., during the upstream window 306 of the PHY frame 320, FIG. 3B, or the upstream window 810 of the PHY frame 8010, FIG.8).

In some embodiments, a start of the upstream window in the MAC 218 (FIG. 2) is delayed (912) by the duration of the probing slot, as shown for the "probing enabled" case of FIG. 6A. This delay accommodates the reduced duration of data transmission for an upstream window as described for operation 904.

In some embodiments, a rate of the MAC 218 is adapted (914) in accordance with the effective rate of the coax PHY 224 (FIG. 2) in the first mode. For example, the MAC 218 is informed of the effective rate of the coax PHY 224 in the first mode (e.g., through the MDIO bus 223, FIG. 2) and adapts its rate accordingly.

In some embodiments, the coax PHY 224 maps (916) time-domain data from the MAC 218 to coax resources in the time and frequency domains that are used to transmit the data. The coax PHY 224 delays the mapping by the duration of the probing slot in the first mode, as shown in FIG. 6B. This delay accommodates the reduced duration of data transmission for an upstream window as described for operation 904.

In the second mode, data is received (918) during a downstream window (e.g., downstream window 304 of a PHY frame 300, FIGS. 3A and 8) and transmitted (920) during an upstream window (e.g., upstream window 306 of a PHY frame 300, FIGS. 3A and 8).

A counterpart to the method 900 is performed in the CLT 162 to which the CNU 140 of the method 900 is coupled. A duration of data reception in an upstream window (e.g., upstream window 306 of a PHY frame 320, FIG. 3B) or a duration of data transmission in a downstream window (e.g., downstream window 806 of a PHY frame 800, FIG. 8) in the first mode is reduced by a specified amount with respect to the second mode (e.g., with respect to a duration of data reception in an upstream window 306 or data transmission in a downstream window 304 in a PHY frame 300, FIGS. 3A and 8), in accordance with operation 904. In the first mode, data is transmitted during the downstream window, a sounding signal (e.g., sounding signal 402, FIG. 4) is received in the probing slot (e.g., probing slot 312, FIG. 3B, or 804, FIG. 8), and data is received in the upstream window. In the second mode, data is transmitted during a downstream window (e.g., downstream window 304 of a PHY frame 300, FIGS. 3A and 8) and received during an upstream window (e.g., upstream window 306 of a PHY frame 300, FIGS. 3A and 8).

The method 900 includes a number of operations that appear to occur in a specific order. It should be apparent, however, that the method 900 can include more or fewer operations, an order of two or more operations may be changed, performance of two or more operations may overlap, and two or more operations may be combined into a single operation.

In some embodiments, the MAC functionality as described herein is implemented in software.

Figure 10A:
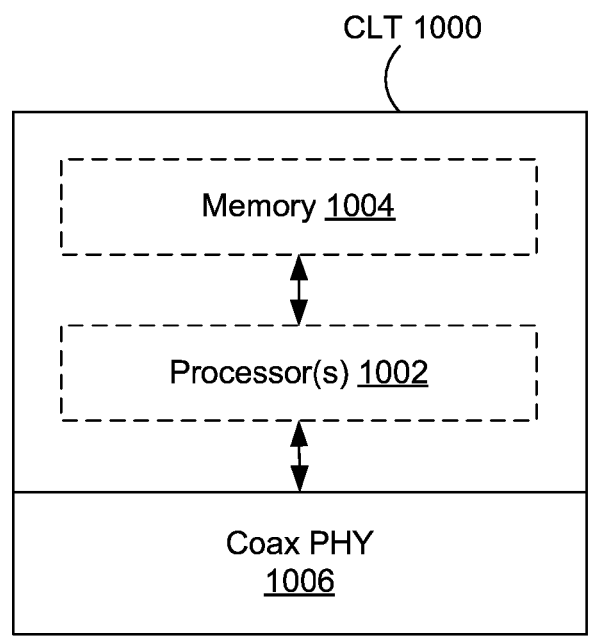
FIG. 10A is a block diagram of a coax line terminal in accordance with some embodiments.

FIG. 10A is a block diagram of a CLT 1000 in accordance with some embodiments. The CLT 1000 is an example of a CLT 162 (FIGS. 1A, 1B, and 2). In the CLT 1000, a coax PHY 1006 (e.g., coax PHY 212, FIG. 2) is coupled to one or more processors 1002, which are coupled to memory 1004. In some embodiments, the memory 1004 includes a non-transitory computer-readable medium (e.g., one or more nonvolatile memory elements, such as EPROM, EEPROM, Flash memory, a hard disk drive, and so on) that stores instructions for execution by the one or more processors 1002. The instructions include instructions that, when executed by the processor(s) 1002, cause the CLT 1000 to implement the functionality of the MAC 206, RS 208, and/or MPCP implementation 202 (FIG. 2) as described herein. For example, the instructions include instructions that, when executed by the processor(s) 1002, cause the CLT 1000 to perform all or a portion of the CLT counterpart to the method 900 (FIG. 9).

While the memory 1004 is shown as being separate from the processor(s) 1002, all or a portion of the memory 1004 may be embedded in the processor(s) 1002. In some embodiments, the processor(s) 1002 and/or memory 1004 are implemented in the same integrated circuit as the coax PHY 1006. For example, the coax PHY 1006 may be integrated with the processor(s) 1002 in a single chip, while the memory 1004 is implemented in a separate chip. In another example, the processor(s) 1002, memory 1004, and coax PHY 1006 are integrated in a single chip.

Figure 10B:
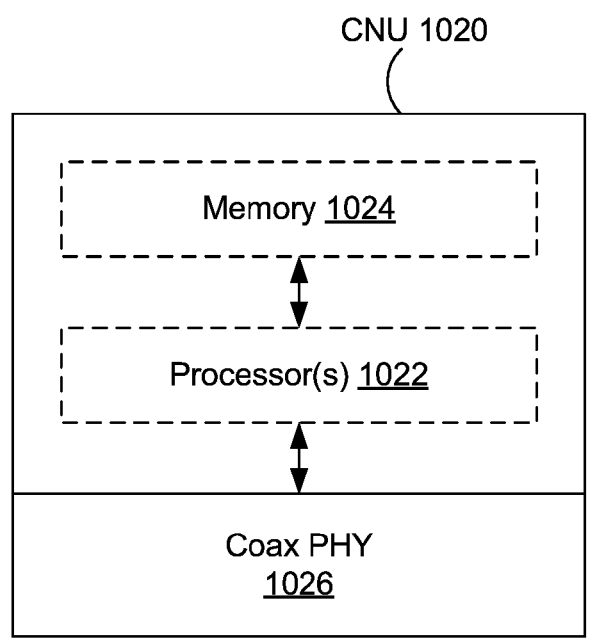
FIG. 10B is a block diagram of a coax network unit in accordance with some embodiments.

FIG. 10B is a block diagram of a CNU 1020 in accordance with some embodiments. The CNU 1020 is an example of a CNU 140 (FIGS. 1A, 1B, and 2). In the CNU 1020, the coax PHY 1026 (e.g., coax PHY 224, FIG. 2) is coupled to one or more processors 1022, which are coupled to memory 1024. In some embodiments, the memory 1024 includes a non-transitory computer-readable medium (e.g., one or more nonvolatile memory elements, such as EPROM, EEPROM, Flash memory, a hard disk drive, and so on) that stores instructions for execution by the one or more processor cores 1022. The instructions include instructions that, when executed by the processor(s) 1022, cause the CNU 1020 to implement the functionality of the MAC 218, RS 220, and/or MPCP implementation 216 (FIG. 2), as described herein. For example, the instructions include instructions that, when executed by the processor(s) 1022, cause the CNU 1020 to perform all or a portion of the method 900 (FIG. 9).

While the memory 1024 is shown as being separate from the processor(s) 1022, all or a portion of the memory 1024 may be embedded in the processor(s) 1022. In some embodiments, the processor(s) 1022 and/or memory 1024 are implemented in the same integrated circuit as the coax PHY 1026. For example, the coax PHY 1026 may be integrated with the processor(s) 1022 in a single chip, which may or may not also include the memory 1024.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of data communication in a coax network unit (CNU) configured to operate in a first mode and a second mode and coupled to a coax line terminal (CLT) via a physical (PHY) link channel, the method comprising:
   when operating in the second mode, transmitting data during an upstream window and receiving data during a downstream window, wherein a probing procedure is disabled during the second mode; and
   when operating in the first mode:
      enabling the probing procedure;
      reducing a duration of data transmission for the upstream window or a duration of data reception for the downstream window by a specified amount with respect to the second mode; and
   transmitting, during the probing produce, a wideband sounding signal in a probing slot having a duration corresponding to the specified amount, wherein the wideband sounding signal estimates the PHY link channel between the CNU and the CLT.

2. The method of claim 1, wherein the wideband sounding signal comprises an orthogonal frequency-division multiplexing (OFDM) symbol.

3. The method of claim 2, wherein the OFDM symbol spans an available frequency band.

4. The method of claim 2, wherein the OFDM symbol is preceded and followed by respective periods of no transmission in the probing slot.

5. The method of claim 4, wherein a sum of a duration of the OFDM symbol and durations of the periods of no transmission equals the specified amount.

6. The method of claim 1, wherein the reducing comprises reducing the duration of data transmission for the upstream window in the first mode by the specified amount with respect to the second mode, the method further comprising:
   in the first mode, delaying a start of the upstream window in a media access controller (MAC) of the CNU by the duration of the probing slot.

7. The method of claim 1, wherein the reducing comprises reducing the duration of data transmission for the upstream window in the first mode by the specified amount with respect to the second mode, the method further comprising:
   providing time-domain data from a media access controller (MAC) of the CNU to a coax physical layer (PHY) of the CNU;
   in the coax PHY, mapping the time-domain data to coax resources in time and frequency domains; and
   in the coax PHY in the first mode, delaying the mapping of the time-domain data to the coax resources by the duration of the probing slot.

8. The method of claim 7, wherein timing for providing the time-domain data from the MAC to the coax PHY in the first mode is unchanged with respect to timing for providing time-domain data from the MAC to the coax PHY in the second mode.

9. The method of claim 7, further comprising:
   informing the MAC of an effective rate of the PHY for upstream data transmission; and
   adapting a rate of the MAC for upstream data transmission in the first mode in accordance with the effective rate of the PHY.

10. The method of claim 9, wherein the informing comprises providing the effective rate of the PHY to the MAC on a management data input/output (MDIO) bus.

11. The method of claim 1, further comprising, in the first mode in the CNU, transmitting data upstream in a plurality of orthogonal frequency-division multiplexing (OFDM) symbols in the upstream window after the probing slot.

12. The method of claim 1, further comprising, in the CNU:
   receiving a channel estimate from the CLT in response to transmitting the wideband sounding signal; and
   performing pre-equalization of upstream transmissions based on the channel estimate.

13. The method of claim 1, further comprising, in the CNU:
   in response to transmitting the wideband sounding signal, receiving an assignment of a modulation profile from the CLT, wherein the modulation profile specifies one or more modulation and coding schemes; and
   transmitting data upstream to the CLT using the one or more modulation and coding schemes.

14. The method of claim 1, wherein the PHY link channel comprises a plurality of contiguous subcarriers.

15. A coax network unit (CNU) configured to operate in a first mode and a second mode, the CNU comprising:
   a media access control (MAC) layer; and
   a coax physical layer (PHY), coupled to the MAC layer via a media independent interface and a bus, to transmit data during upstream windows and receive data during downstream windows in the second mode, wherein a probing procedure is disabled during the second mode; and
   when operating in the first mode, the coax PHY is to:
      enable the probing procedure;
      reduce a duration of data transmission for an upstream window or a duration of data reception for a downstream window by a specified amount with respect to the second mode; and
   transmit, during the probing procedure, a wideband sounding signal in a probing slot having a duration corresponding to the specified amount, wherein the wideband sounding signal estimates a channel between the CNU and a coax line terminal CLT.

16. The CNU of claim 15, wherein the wideband sounding signal comprises an orthogonal frequency-division multiplexing (OFDM) symbol.

17. The CNU of claim 15, wherein:
   the coax PHY is to reduce the duration of data transmission for the upstream window in the first mode by the specified amount with respect to the second mode; and the CNU further comprises a media access controller (MAC) to provide data to the coax PHY, wherein the MAC is to delay a start of an upstream window in the MAC by the duration of the probing slot in the first mode.

18. The CNU of claim 15, wherein:
the coax PHY is to reduce the duration of data transmission for the upstream window in the first mode by the specified amount with respect to the second mode;
the CNU further comprises a media access controller (MAC) to provide time-domain data to the coax PHY;
the coax PHY is to map the time-domain data to coax resources in the time and frequency domains; and
in the first mode, the coax PHY is to delay mapping of the time-domain data to the coax resources by the duration of the probing slot.

19. The CNU of claim 18, wherein timing in the MAC for providing the time-domain data to the coax PHY in the first mode is unchanged with respect to timing in the MAC for providing time-domain data to the coax PHY in the second mode.

20. The CNU of claim 18, further comprising a bus coupling the coax PHY with the MAC, to inform the MAC of an effective rate of the PHY for upstream data transmissions;
wherein the MAC is to adapt its rate for upstream data transmissions in the first mode in accordance with the effective rate of the PHY.

21. The CNU of claim 20, wherein the bus comprises a management data input/output (MDIO) bus.

22. A non-transitory computer-readable storage medium storing one or more programs containing instructions that, when executed by one or more processors in a coax network unit (CNU) configured to operate in a first mode and a second mode, cause the CNU to:
transmit data during an upstream window and receive data during a downstream window when operating in the second mode, wherein a probing procedure is disabled during the second mode; and
when operating in the first mode:
enable the probing procedure;
reduce a duration of data transmission for the upstream window or a duration of data reception for the downstream window by a specified amount with respect to the second mode; and
transmit, during the probing procedure, a wideband sounding signal in a probing slot having a duration corresponding to the specified amount, wherein the wideband sounding signal estimates a channel between the CNU and a coax line terminal (CLT).

23. The non-transitory computer-readable storage medium of claim 22, wherein execution of the instructions to adapt the rate causes the CNU to delay a start of the upstream window in the MAC by the duration of the probing slot in the first mode.

24. The non-transitory computer-readable storage medium of claim 22, wherein execution of the instructions to adapt the rate causes the CNU to adapt the rate without adapting timing of a media access controller (MAC).

25. The non-transitory computer-readable storage medium of claim 22, wherein execution of the instructions to adapt the rate causes the CNU to adapt the rate in accordance with an effective rate of a coax physical layer (PHY) in the CNU.

26. A coax network unit (CNU) configured to operate in a first mode and a second mode, comprising:
first means for transmitting data during an upstream window of a time-division-duplexing (TDD) cycle and receiving data during a downstream window of a TDD cycle when operating in the second mode, wherein a probing procedure is disabled during the second mode; and
second means for providing data to the first means;
wherein during the first mode, the first means is to:
enable the probing procedure;
reduce a duration of data transmission for the upstream window or a duration of data reception for the downstream window by a specified amount with respect to the second mode; and
transmit, during the probing procedure, a wideband sounding signal in a probing slot having a duration corresponding to the specified amount, wherein the wideband sounding signal estimates a channel between the CNU and a coax line terminal.

27. The CNU of claim 26, wherein a rate of the second means is adaptable in accordance with the first and second modes.

28. The CNU of claim 27, wherein:
the second means comprise means for providing time-domain data to the first means; and
the first means comprise means for delaying the time-domain data by the specified amount in the first mode.

29. The CNU of claim 26, further comprising:
third means for informing the second means of an effective rate of the first means, wherein a rate of the second means is adaptable in accordance with the effective rate of the first means.

* * * * *